Feb. 2, 1965 H. GAMLEN 3,167,950
VISCOSIMETER
Filed June 1, 1960 3 Sheets-Sheet 1
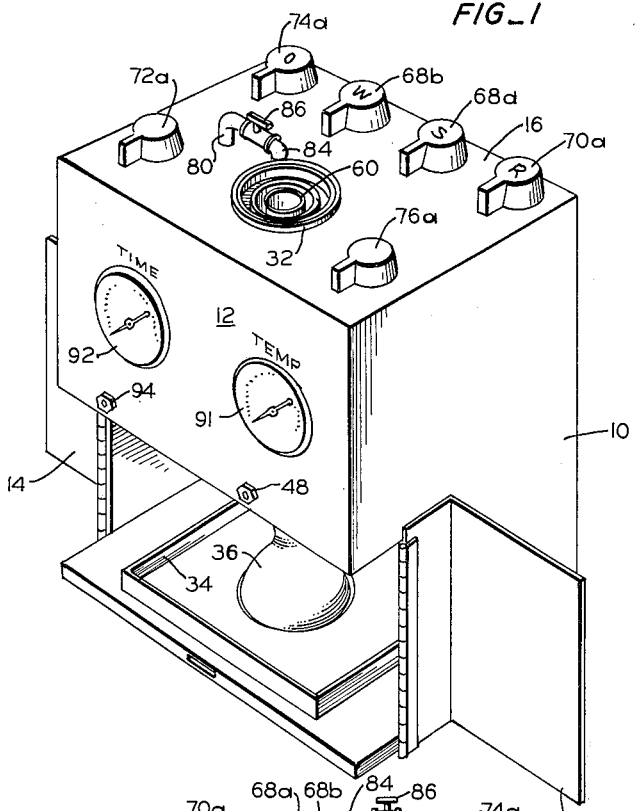
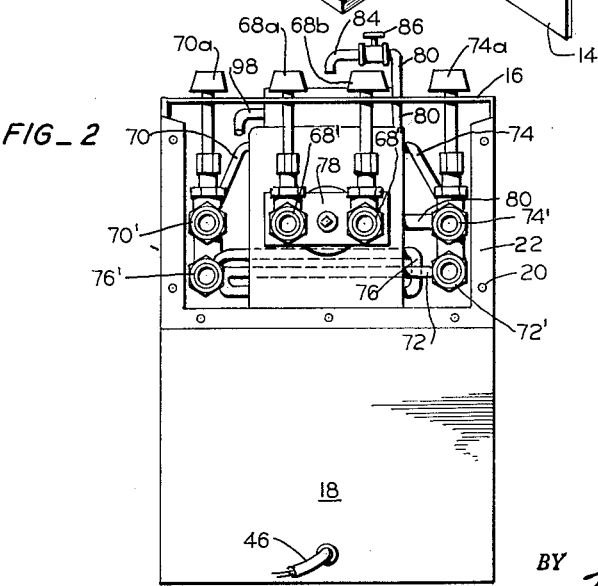
INVENTOR.
HARRY GAMLEN
BY Naylor & Neal
ATTORNEYS Feb. 2, 1965        H. GAMLEN        3,167,950
VISCOSIMETER
Filed June 1, 1960                3 Sheets-Sheet 2
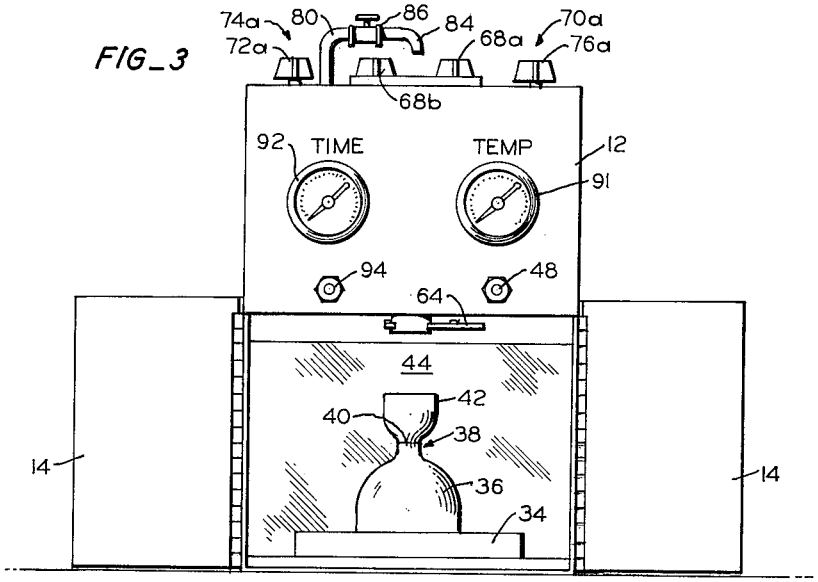
FIG_3
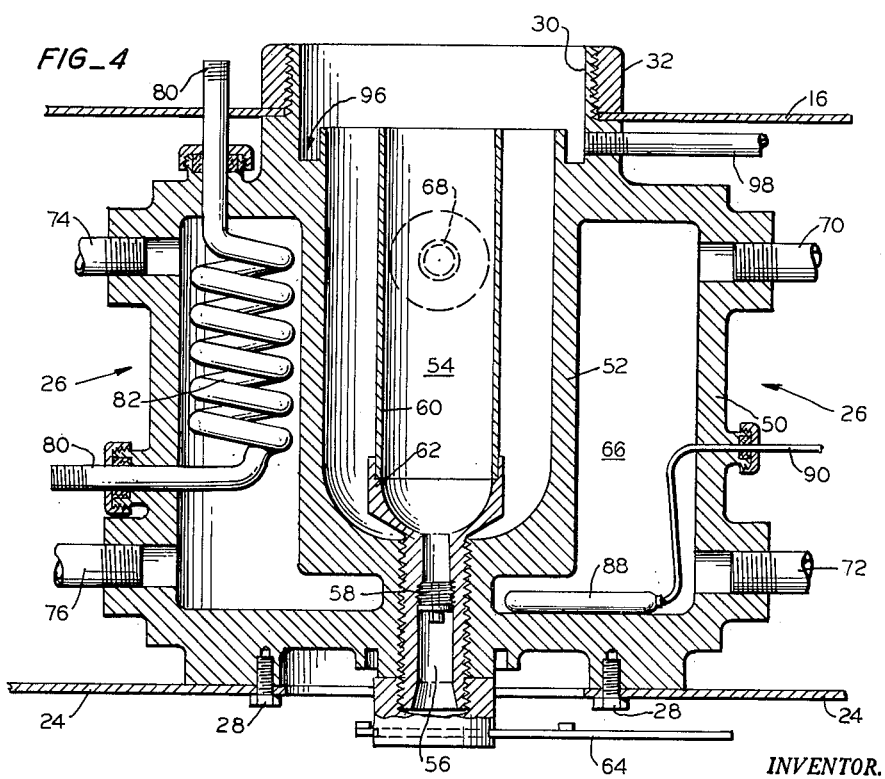
FIG_4
INVENTOR.
HARRY GAMLEN
BY
Naylor & Neal
ATTORNEYS

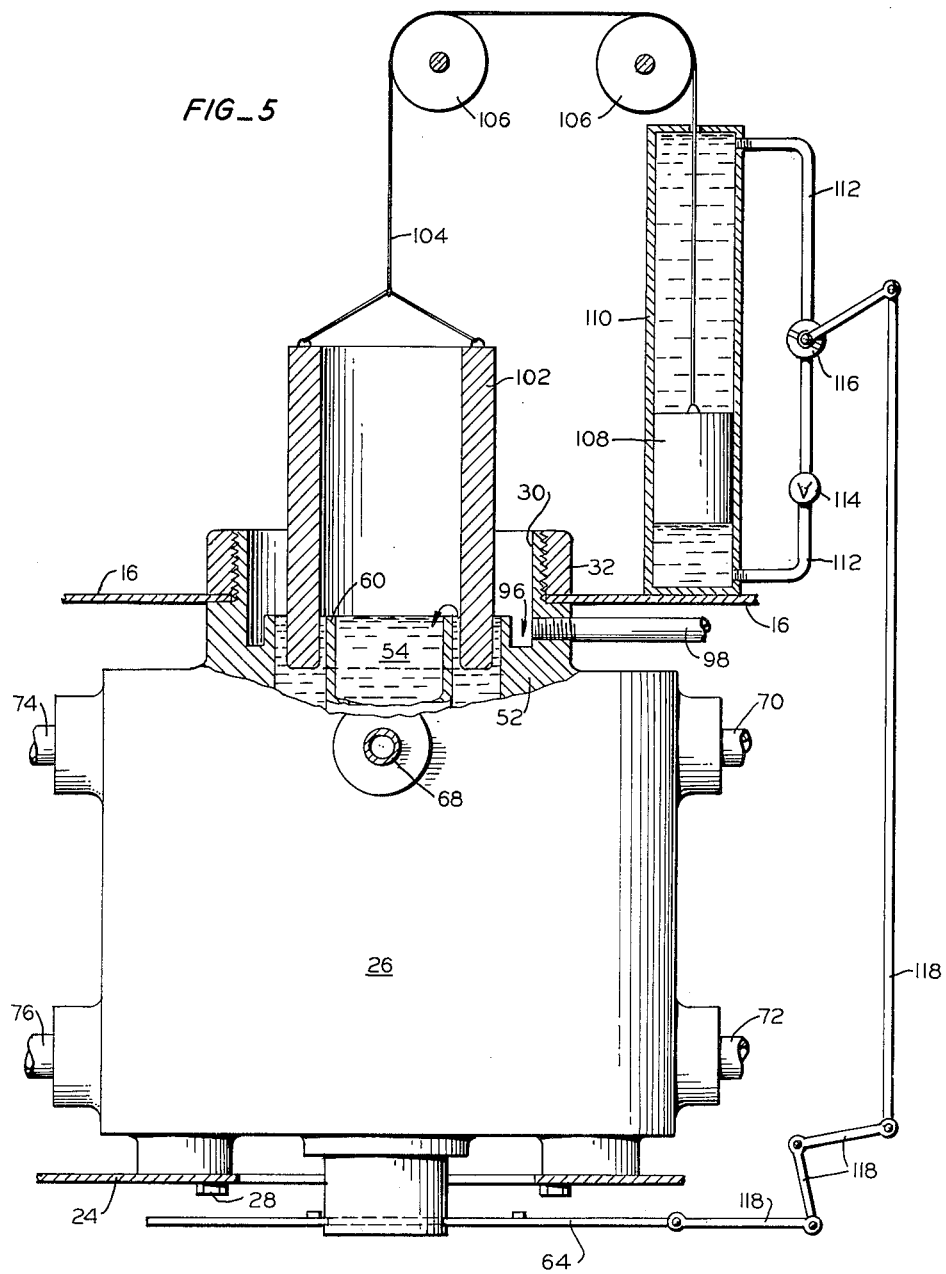

ated Feb. 2, 1965

3,167,950
VISCOSIMETER
Harry Gamlen, 5 Downey Way, Hillsborough, Calif.
Filed June 1, 1960, Ser. No. 33,132
1 Claim. (Cl. 73—56)

This invention relates to viscosimeters and more specifically to improvements in the type of viscosimeters disclosed in my U.S. Patent No. 2,743,605 granted May 1, 1956.

It is a principal object of this invention to provide an improved viscosimeter by which the viscosity of a liquid can be measured more efficiently and accurately than was possible heretofore.

It is another object of this invention to provide such an improved viscosimeter which is well suited to measuring the viscosity of liquids, both boiler and engine fuels and other liquid commodities, over a broad temperature range from sub-freezing temperatures to elevated temperatures substantially above atmospheric temperatures.

It is another object of this invention to provide such an improved viscosimeter which is particularly well-suited for use as a fuel oil pre-heat temperature indicating device in accordance with teachings of my above-identified U.S. Patent.

It is another object of this invention to provide such an improved viscosimeter which is also well suited to measuring the pumpability of marine and industrial fuels at substantially sub-atmospheric temperatures, thereby providing a single unit for determining the proper fuel oil pre-heat temperature in a ship, in accordance with my above-identified patent, and for determining the minimum temperature to which a ship's fuel tanks, cargo tanks can be allowed to cool and to determine the most economical temperatures for pumping and handling in both marine and industrial practice.

It is a more specific object of this invention to provide such an improved viscosimeter in which more accurate viscosity measurements may be obtained than heretofore possible by maintaining a constant liquid head in the viscosimeter while measurements are being taken without restricting the temperature conditions under which the viscosimeter can be used.

It is another specific object of this invention to provide such an improved viscosimeter in which the viscosity measurements may be made of liquids at super-atmospheric temperatures and sub-atmospheric temperatures while maintaining a constant liquid head in the viscosimeter and a constant temperature of the liquid body in the viscosimeter.

It is another object of this invention to provide such an improved viscosimeter which can be operated efficiently and accurately by unskilled and untrained personnel.

Other objects and advantages of the invention will become apparent from the following description read in conjunction with the attached drawings in which:

FIG. 1 is a perspective view of a viscosimeter constructed in accordance with the principles of this invention;

FIG. 2 is a view of the apparatus of FIG. 1 taken in rear elevation with a portion of the rear wall of the viscosimeter housing removed;

FIG. 3 is a view in front elevation of the apparatus of FIGS. 1 and 2;

FIG. 4 is a vertical sectional view of the apparatus of FIGS. 1 to 3 taken centrally of the machine in the plane of FIG. 3; and FIG. 5 is a front view in elevation, partially broken away, of an alternative form of viscosimeter constructed in accordance with the principles of this invention.

Broadly stated this invention comprises a viscosimeter comprising in combination of body defining an open top chamber for impounding a quantity of liquid the viscosity of which is to be measured, means for maintaining liquid in said chamber at a predetermined temperature, a fluid efflux orifice extending from said chamber adjacent to the bottom thereof, means for opening and closing said orifice, means for collecting a sample of fluid passing through said orifice while measuring the time necessary to collect said sample, and means for maintaining a constant level of liquid in said chamber including means for introducing fluid into said chamber at said predetermined temperature.

Referring now in detail to the drawings and particularly to FIGS. 1 to 4, the preferred form of apparatus of my invention illustrated therein comprises a housing having a sidewall 10, a front wall 12, and a pair of doors 14 hingedly mounted on the sidewalls 10 and cooperative with the front wall 12 to enclose the entire front of the machine. The housing also includes a top panel 16 and a back panel 18 (see FIG. 2); the upper portion of the back panel 18 is removably secured to the housing by means of screws inserted through apertures 20 in a flange 22. As indicated in FIG. 4, an interior wall 24 extends horizontally through the housing about mid-way in its height and is secured at its edges to the walls of the housing.

A viscosimeter body 26 (see FIG. 4) is mounted on the wall 24 by means of screws 28, and the top of the body 26 is provided with an upwardly extending neck 30 which is secured to the top wall 16 of the housing by means of a threaded collar 32. The portion of the housing below the wall 24 is provided with a platform 34 on which a calibrated sample flask 36 is removably mounted. The flask 36 is provided with a constricted neck 38 for facilitating the measurement of its liquid content, and the neck 38 is provided with an index mark 40 thereon positioned to indicate a predetermined volume of the flask 36 below the index 40. The flask 36 is also provided with bell mouth 42 which permits the flask to contain a quantity of liquid substantially exceeding the predetermined volume. The back of the housing below the wall 24 is provided with a translucent screen 44 behind which is mounted an electric lamp (not shown) for which electrical power is supplied through a cord 46 (see FIG. 2) with the circuit to the light being controlled by a switch 48 mounted on the front of the housing.

The viscosimeter body 26 is provided with an outer wall 50 and an inner wall 52 (see FIG. 4). The inner wall 52 defines a generally cylindrical, open top chamber 54 which is adapted to receive a sample of the liquid the viscosity of which is to be measured. The bottom of the body 26 is provided with a threaded cylindrical bore 56 in which suitable viscosity tips 58 may be mounted. A plurality of different tips 58 are provided for the device and are interchangeable to permit the use of the viscosimeter for making viscosity measurements in many systems. As indicated in FIG. 4, the internal diameter of chamber 54 may be reduced by the insertion therein of a cylindrical wall 60 carrying a threaded body 62 on the bottom thereof which may be threadedly received in the passageway 56.

By the provision of a plurality of different cylindrical walls 60, bodies 62, and viscosity tips 58, the device illustrated herein is adapted for the measurement of viscosities in accordance with all of the established systems for measuring viscosity such as the Saybolt system, Gamlen system and Redwood system.

A slide valve 64 is provided on the bottom of the body 26 providing means for closing and opening the passageway 56. Of course, the slide valve 64 may be replaced by a cork used by the prior art, but the slide valve 64 is more simple to use and prevents the machine operator from burning his fingers on hot oil and the like.

Body 26 defines a fluid jacket 66 between the outer wall 50 and the inner wall 52 of the body, and five liquid communicating passageways 68, 70, 72, 74 and 76 are provided extending into the jacket 66. The conduit 68 is connected to a fluid mixing manifold 78 (see FIG. 2) on the back of body 26 and two fluid supply fittings 68′ and 68″ are provided leading into manifold 68 and controlled by valves 68A and 68B. The conduits 70, 72, 74, and 76 are connected to corresponding fluid supply fittings 72′, 74′, and 76′ the fluid supply through which is controlled by valves 70A to 76A respectively.

A fluid supply conduit 80 leads into the body 26 and passes through a heat exchange coil 82 in the jacket chamber 66, thence through the top wall of body 26 and the top wall 16 of the viscosimeter housing. The conduit 80 is provided with a discharge spout 84 on the top thereof immediately over the center of the liquid sample chamber 54, and a manual valve 86 is provided in the conduit 80 above the top of the viscosimeter housing. The conduit 80 may be made of a flexible material to permit changing of the wall 60 and the body 62. The end of conduit 80 remote from the discharge spout 84 is connected to the fluid supply fitting 74′ on the side of valve 74A remote from the viscosimeter body 26; that is the conduits 80 and 74 are connected to the same supply of liquid and are regulated independently by the valves 86 and 74A.

Thermally responsive means 88 is provided in the bottom of jacket 66 and is connected by a lead 90 to a temperature gauge 91 mounted in the front wall 12 of the viscosimeter housing. The temperature gauge 91 is mounted on one side of the front face of the viscosimeter housing and a stop-clock 92 is mounted on the other side and is controlled by a switch 94. Where it is desirable to provide a gauge for measuring the pressure in the chamber 66, it is convenient to replace the clock 92 with the gauge and mount the clock on the inside of one of the housing doors 14.

It should be noted that the inner wall 52 of the viscosimeter body extends upwardly inside of the annular member 30 to define a gallery 96 around the mouth of chamber 54. An overflow conduit 98 leads from the gallery 96 below the level of the mouth of chamber 54, and the overflow conduit 98 extends out through the back of the housing to a suitable container (not shown).

In operation of the viscosimeter illustrated in FIGS. 1 to 4, the conduit fitting 74′ is connected to a source of preheated fuel oil in the fuel oil pre-heat line, and the fitting 72′ is connected to a return conduit in that line. The fitting 68′, which is controlled by valve 68a is connected to a source of steam, and the fitting 68″ which is controlled by the valve 68B is connected to a source of water. The fitting 70′ is connected to a source of a suitable refrigerant. The fitting 76′ is connected to a conduit which leads to some suitable waste disposal means. Temperature control fluid is circulated through the jacket 66 in the viscosimeter body 26 by means of the valves 68a through 76a. When it is desirable to employ the viscosimeter in accordance with the teachings of my above-identified U.S. patent, the valves 72a and 74a are opened so that the fluid circulating through jacket 66 is the preheated fuel oil which is passing from the fuel oil preheater to a boiler furnace or diesel engine; the remainder of the valves 68a through 76a are closed. When it is desirable to measure the viscosity of a liquid at a temperature other than the temperature of the preheated fuel oil, the valves 72a and 74a are closed and the valve 76a is opened together with one or more of the valves 68a, 68b and 70a. In the latter situation the liquid sample in the chamber 54 is maintained at any desired temperature between the temperature of the refrigerant being supplied through conduit 70′ and the temperature of the steam being supplied through conduits 68′, intermediate temperatures being obtained by mixing of steam, water and refrigerant. The fluids passing through the jacket 66 from the conduits 68′, 68″ and 70″ are exhausted through conduit 76 and passed to waste. In some situations it is desirable to provide an electrical heating element, with or without a thermostatic control, in the body 50 which may be used together with or in lieu of the fluid connections mentioned.

In this manner the temperature of the liquid in chamber 54 may be controlled at any desired temperature while viscosity measurements are being made in the customary manner by measuring the flow time in seconds necessary for fluid to flow through the viscosity tip 58 out of the chamber 54.

The viscosity measurement may thus be taken in accordance with the prior art method by filling the chamber 54 with the liquid, the viscosity of which is to be measured, then opening the slide valve 64 while at the same time actuating the timer switch 94 and then permitting fluid to accumulate in the flask 36 until it rises to the index 40 at which time the timer switch 94 is again actuated, and the flow-time seconds then indicated on the timer dial 92 taken as a measurement of the viscosity of the fluid at that temperature.

In accordance with this invention the viscosity measurement is obtained more accurately by maintaining a constant liquid head in the chamber 54 throughout the period that liquid is accumulating in the flask 36 thereby providing constant liquid velocity through the tips 58 while the measurement is being taken. Thus in accordance with this invention the fluid, the viscosity of which is to be measured, is supplied to the chamber 54 through the conduit 80 and manual valve 86, and the valve 86 is left open as long as fluid is accumulating in the flask 36. It should be noted that the capacity of the conduit 80 and valve 86 exceeds the capacity of the viscosity tip 58 so that the conduit 80 supplies more fluid to chamber 54 than is permitted to escape through the viscosity tip 58 and into the flask 36; the excess fluid supplied by conduit 80 flows over the mouth of chamber 54 into the gallery 96 and hence through the overflow conduit 98. It should be noted that the capacity of conduit 98 exceeds the capacity of conduit 80 and valve 86 thus insuring that the gallery 96 will at all times remain at least partially empty to accept liquid overflowing from the mouth of chamber 54. When viscosity measurements are being taken at temperatures substantially different from atmospheric temperatures and different from the temperature of fluid being supplied to the fittings 74′, the liquid in conduit 80 is heated or cooled in coil 82 to the temperature of liquid in chamber 54 before it is introduced into chamber 54 thereby maintaining a constant temperature in the chamber 54 throughout the period that the measurement is being taken. However, it should be noted that when the viscosimeter is used in accordance with my above-identified U.S. patent to measure viscosities at the temperature of oil in an engine pre-heat line, the coil 82 is unnecessary, and the provision of the overflow conduit 98 is sufficient to provide the increased accuracy afforded by this invention.

Referring now in detail to FIG. 5, the basic parts of the viscosimeter illustrated therein are identical to the parts shown in FIGS. 1 to 4 except that the means for maintaining a constant fluid level in the chamber 54 are changed. In the apparatus of FIG. 5 the conduit 80 and valve 86 have been omitted and a liquid displacing ring 102 is suspended over the chamber 54 by means of a wire 104 extending over pullies 106 and being connected to the piston 108 of a fluid damper 110. The opposite ends of the damper 110 are connected by a fluid passageway 112 containing a variable valve 114 and an off-on valve 116. A linkage of lever arms 118 is provided interconnecting the off-on valve 116 and the slide valve 64 on the base of the viscosimeter body 26. It should be noted that the liquid displacing ring 102 is annular in shape and is positioned to slide into the annular passageway between the cylindrical sleeve 60 and the inner viscosimeter body 52 thereby displacing liquid from between the walls 60 and 52 into the chamber 54 as the ring 102 is lowered into the body 26.

The operation of the device in FIG. 5 is similar to the operation of the device of FIGS. 1 to 4 except that instead of continuously adding liquid to the chamber 54 while liquid is accumulating in the flask 36, the displacing ring 102 is lowered into the chamber 54 to displace liquid to the inside of the cylindrical sleeve 60 from the outside thereof. The slide valve 64 is interconnected to the off-on valve 116 in order to open the damper 110 and start the descending movement of the ring 102 at the same time that fluid starts to flow through the passageway 56. The variable valve 114 is adjusted to permit descending movement of the ring 102 at a rate just exceeding the rate necessary for the ring 102 to displace enough liquid to fill the chamber 54, the excess liquid flowing into the gallery 96 and hence into the overflow conduit 98. It should be noted that since the liquid inside and outside of the sleeve 60 is maintained at the same temperatures by means of fluid circulating in the jacket of the viscosimeter body 26, the liquid being added to the center of the sleeve 60 while the viscosity measurement is being taken does not change the temperature of the liquid therein.

While certain specific embodiments of the invention have been illustrated in the drawings and described herein, it is obvious that many alterations may be made in the construction and arrangements of parts without departing from the spirit and scope of the invention.

What is claimed is:

A viscosimeter comprising in combination a body defining a chamber for impounding a quantity of liquid the viscosity of which is to be measured and a jacket surrounding said chamber with said chamber having a top open directly to atmosphere, means for passing a fluid through said jacket to control the temperature of the liquid in said chamber, a fluid efflux orifice extending from said chamber adjacent to the bottom thereof, means for opening and closing said orifice, means for collecting a sample of fluid passing through said orifice while measuring the time necessary to collect said sample, an overflow gallery surrounding the upper end of said chamber, a fluid efflux passageway leading from said gallery below the level of the top of said chamber, and a supply conduit for said liquid leading through said jacket in heat exchange relation with fluid in said jacket and to said chamber, the capacity of said supply conduit exceeding the capacity of said orifice, and the capacity of said passageway exceeding the capacity of said conduit.

References Cited in the file of this patent
UNITED STATES PATENTS

| | | |
|---|---|---|
| 1,132,621 | Saybolt | Mar. 23, 1915 |
| 1,518,167 | Tseng | Dec. 9, 1924 |
| 1,828,210 | Williams | Oct. 20, 1931 |
| 1,831,980 | Teschner | Nov. 17, 1931 |
| 2,743,605 | Gamlen | May 1, 1956 |